D. J. H. BACON.
SHAFT BEARING.
APPLICATION FILED FEB. 11, 1919.

1,325,553.

Patented Dec. 23, 1919.

WITNESS:

INVENTOR
David J. H. Bacon
BY
Frank L. Busser
ATTORNEY.

UNITED STATES PATENT OFFICE.

DAVID J. H. BACON, OF WILMINGTON, DELAWARE, ASSIGNOR TO DELAWARE MARINE MOTORS COMPANY, OF WILMINGTON, DELAWARE, A CORPORATION OF DELAWARE.

SHAFT-BEARING.

1,325,553.  Specification of Letters Patent.  Patented Dec. 23, 1919.

Application filed February 11, 1919. Serial No. 276,320.

*To all whom it may concern:*

Be it known that I, DAVID J. H. BACON, a citizen of the United States, residing at Wilmington, county of New Castle, and State of Delaware, have invented a new and useful Improvement in Shaft-Bearings, of which the following is a full, clear, and exact description, reference being had to the accompanying drawings, which form a part of this specification.

My invention relates to shaft bearings and is especially adapted for gas engines, although applicable to other uses. The object of the invention is to enable the removal of the shaft bearing without removing or disturbing the shaft.

The invention is susceptible of different embodiments, two preferred forms of which are shown in the drawings, in which—

Figures 1, 2, 3:
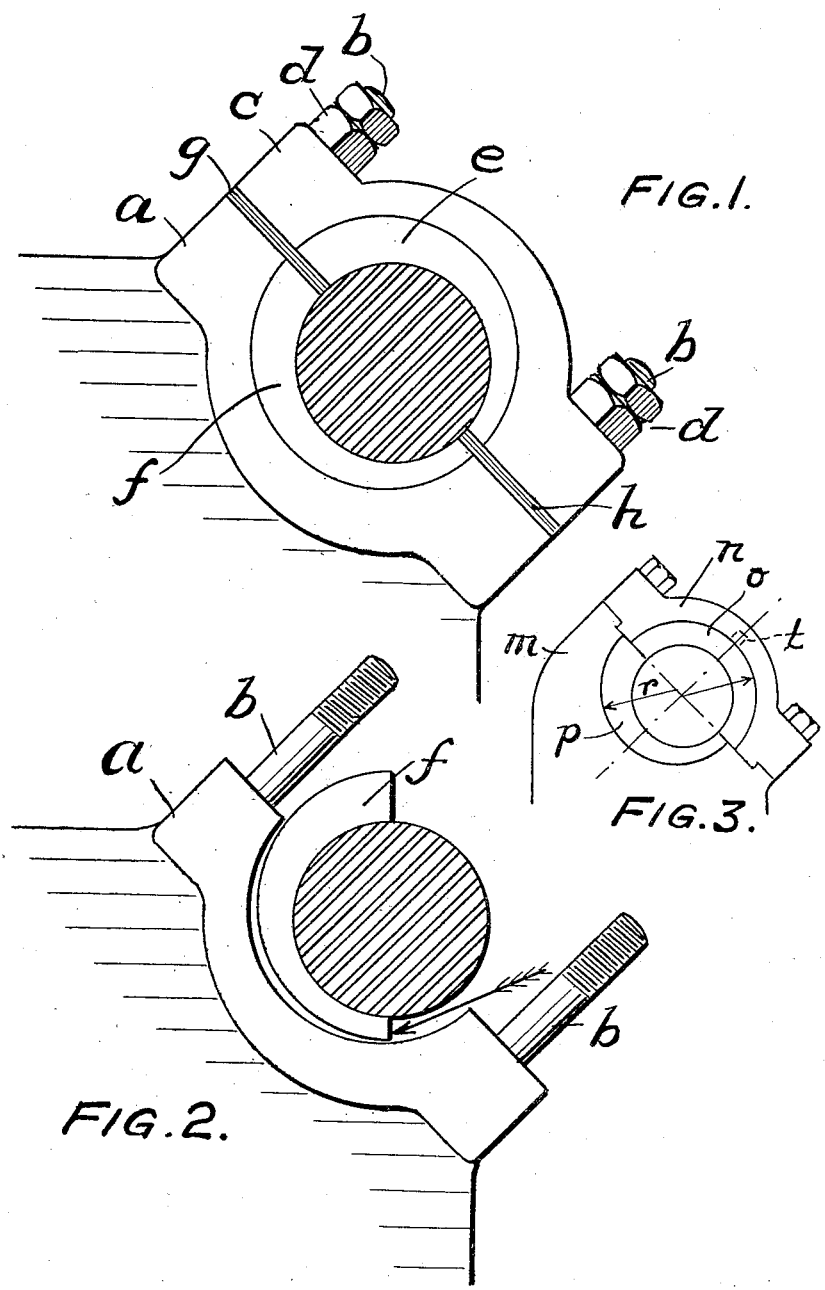
Figure 1 is a cross-section through the bearing.
Fig. 2 is a similar view illustrating the operation of removing the bearing.
Fig. 3 is a diagram, on a smaller scale, illustrating a modification.

Referring first to Figs. 1 and 2:

$a$ is the lower bearing member carrying the bolts $b$. $c$ is the upper bearing member or cap orificed to engage the bolts $b$ and secured by nuts $d$ in the ordinary manner. The bushing is shaped as an eccentric split along that diameter thereof which intersects its opposing thickest and thinnest portions, forming two bushing members, $e$ and $f$, each of which is wedge-shaped. To prevent the bushing from turning, radial shims $g$ and $h$ are interposed between the two bearing members and the two bushing members.

After removing the cap $c$ and the bushing $e$ the bushing $f$ may be readily partially dislodged, without removing or disturbing the shaft, by means of a pushing or light hammering action against the end of the bushing $f$ of smaller area, as indicated by the arrow in Fig. 2, until the bushing is loose, after which it may easily be lifted or drawn out.

The bushing may be replaced by an obvious reverse operation.

It is not essential that the entire bushing shall be eccentric. Thus in Fig. 3, the lower bearing member $m$ and the cap $n$ are formed with semi-circular bushing-receiving grooves which, when positioned, are out of alinement, the upper one being concentric with the axis of the shaft and the lower one being turned on a radius $r$ from a center at one side of the axis of the shaft. The upper bushing $o$ in the cap $n$ is of ordinary concentric form. The lower bushing $p$ is made eccentric, its inner or bearing face being bored to fit the shaft and its outer face being turned eccentrically to fit the lower bearing member. The bushing $o$ has a dowel $t$ to prevent it from turning.

Having now fully described my invention, what I claim and desire to protect by Letters Patent is:

1. In a shaft bearing, the combination with the shaft, of two bearing members, and bushings between the respective bearing members and the shaft, one of said bushings being wedge-shaped to permit its removal in a circumferential direction.

2. In a shaft bearing, the combination with the shaft, of a supporting member, a wedge-shaped bushing between the supporting member and the shaft and extending part way around the shaft, and removable means to inclose the remainder of the shaft and hold the bushing from turning.

3. In a shaft bearing, the combination with the shaft, of a bearing member having its inner face eccentric to the axis of the shaft, a wedge-shaped bushing interposed between the bearing member and the shaft, and a removable cap, said bushing being removable in a circumferential direction upon the removal of the cap.

4. In a shaft bearing, the combination of the shaft, of a bearing member, a bushing between the bearing member and the shaft, the outer face of the bushing and the inner face of the bearing member being eccentric to the axis of the shaft, and means to hold the bushing from turning, said bushing being removable in a circumferential direction when said holding means are rendered inoperative.

5. In a shaft bearing, the combination with the shaft, of two bushings affording a circumferentially continuous bearing face for the shaft, and means to inclose and position the bushings, one of said bushings being wedge-shaped to permit its removal in a circumferential direction.

In testimony of which invention, I have hereunto set my hand, at Wilmington, on this 4th day of February, 1919.

DAVID J. H. BACON.